United States Patent
Engelbrecht et al.

(10) Patent No.: US 9,313,485 B2
(45) Date of Patent: Apr. 12, 2016

(54) IMAGERS WITH ERROR CHECKING CAPABILITIES

(71) Applicant: Semiconductor Components Industries, LLC, Phoenix, AZ (US)

(72) Inventors: Dennis Robert Engelbrecht, Philomath, OR (US); Cornelis Daniel Hoekstra, Corvalis, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 121 days.

(21) Appl. No.: 14/186,771

(22) Filed: Feb. 21, 2014

(65) Prior Publication Data

US 2015/0245019 A1   Aug. 27, 2015

(51) Int. Cl.
*H04N 17/00* (2006.01)
*H04N 17/02* (2006.01)
*H04N 5/367* (2011.01)
*H04N 5/357* (2011.01)
*H04N 5/365* (2011.01)

(52) U.S. Cl.
CPC .............. *H04N 17/002* (2013.01); *H04N 5/357* (2013.01); *H04N 5/365* (2013.01); *H04N 5/3675* (2013.01)

(58) Field of Classification Search
CPC ... H04N 17/002; H04N 5/3675; H04N 5/367; H04N 5/365; H04N 5/3651; H04N 5/3653; H04N 5/3655; H04N 5/3657; H04N 5/357

USPC .......................................................... 348/175
See application file for complete search history.

(56) References Cited

U.S. PATENT DOCUMENTS

| | | |
|---|---|---|
| 6,707,493 B1 * | 3/2004 | Lee et al. ........................ 348/246 |
| 8,571,346 B2 | 10/2013 | Lin |
| 2012/0261553 A1 | 10/2012 | Elkind et al. |
| 2013/0027565 A1 | 1/2013 | Solhusvik et al. |
| 2013/0110444 A1 | 5/2013 | Pahr |
| 2013/0175429 A1 * | 7/2013 | Rao et al. .................... 250/208.1 |

* cited by examiner

*Primary Examiner* — Michael Lee
(74) *Attorney, Agent, or Firm* — Treyz Law Group, P.C.; Andrew C. Milhollin (57) ABSTRACT

An imager with error verification capabilities may include an array of pixels and an array of error detection circuits. The array of pixels may receive control signals that control the array of pixels to produce image pixel signals. The error detection circuits may receive the control signals and produce error detection signals. The image pixels and error detection signals may be conveyed over a readout path to image processing circuitry such as an external digital signal processor for detecting control signal errors. Each error detection circuit may be a modified copy of a corresponding pixel in the pixel array or may be a read only memory element. The array of error detection circuits may produce unique values that may be compared to expected values to detect whether correct control signals are provided to the pixel array for a given mode of operation.

21 Claims, 12 Drawing Sheets

IMAGERS WITH ERROR CHECKING CAPABILITIES

BACKGROUND

This relates generally to imaging systems, and more particularly to imaging systems for error-sensitive applications such as automotive applications.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Circuitry such as image sensors can sometimes function incorrectly or produce erroneous output. For example, manufacturing defects, software errors, environmental operating conditions, or cosmic radiation may undesirably affect the circuitry. Imagers that are used in error-sensitive applications such as automotive safety may have limited tolerance for incorrect operation. Consider the scenario in which image data from an image sensor is used to control an adaptive cruise control function or automatic braking function. In this scenario, incorrect image data from the image sensor that does not accurately reflect reality can be a safety hazard (e.g., malfunction of the adaptive cruise control or automatic braking).

DETAILED DESCRIPTION

Imaging systems having digital camera modules are widely used in electronic devices such as digital cameras, computers, cellular telephones, and other electronic devices. A digital camera module may include one or more image sensors that gather incoming light to capture an image. Each sensor, or only some of the image sensors, may be provided with error detection capabilities as described herein.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may operate active braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle. As another example, vehicle safety systems may include surround view of 3D range finding arrangements in which image data from multiple sensors are used.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. However, it may be desirable to continuously monitor the status of imaging system components during operation of the imaging system, particularly in situations in which vehicle safety may be influenced by the quality of imaging data provided by the imaging system. Imaging systems may be provided having this type of on-the-fly (e.g., real-time) verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

Verification image data may be compared with a predetermined standard stored in the imaging system or stored on additional circuitry that is external to the imaging system. The predetermined standard may be a mathematically determined threshold, may sometimes be referred to as a "golden" standard image, may be captured during manufacturing of the imaging system or at another suitable time (e.g., during startup or shutdown of the imaging system), and may include one or more mathematically or experimentally determined ranges to which verification image data may be compared.

Based on the result of the comparison of the verification image data with the predetermined standard, an imaging system may be disabled (e.g., if the result is outside the predetermined range), may continue to operate normally (e.g., if the result is within the predetermined range). In some arrangements, the imaging system may remain operation but an indicator may be presented to users to inform the users that the imaging system needs further inspection and/or repair (e.g., the imaging system may present a "check imaging system" indication when the results of verification operations indicate a potential problem in the operation of the imaging system).

Figure 1:
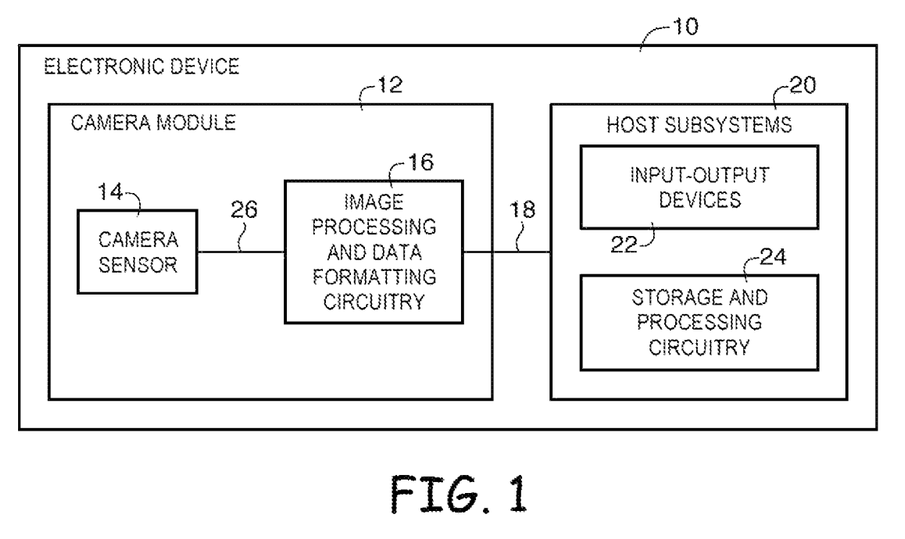
FIG. 1 is an illustrative schematic diagram of an electronic device with a camera sensor that may include an imager with error verification capabilities in accordance with an embodiment of the present invention.

Embodiments of the present invention relate to image sensors with error detection capabilities (e.g., error verification). An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as three-dimensional depth sensing, data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs.

Camera module 12 may convey acquired image data to host subsystems 20 over path 18 (e.g., image processing and data formatting circuitry 16 may convey image data to subsystems 20). Electronic device 10 typically provides a user with numerous high-level functions. In a computer or advanced cellular telephone, for example, a user may be provided with the ability to run user applications. To implement these functions, host subsystem 20 of electronic device 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

Figure 2:
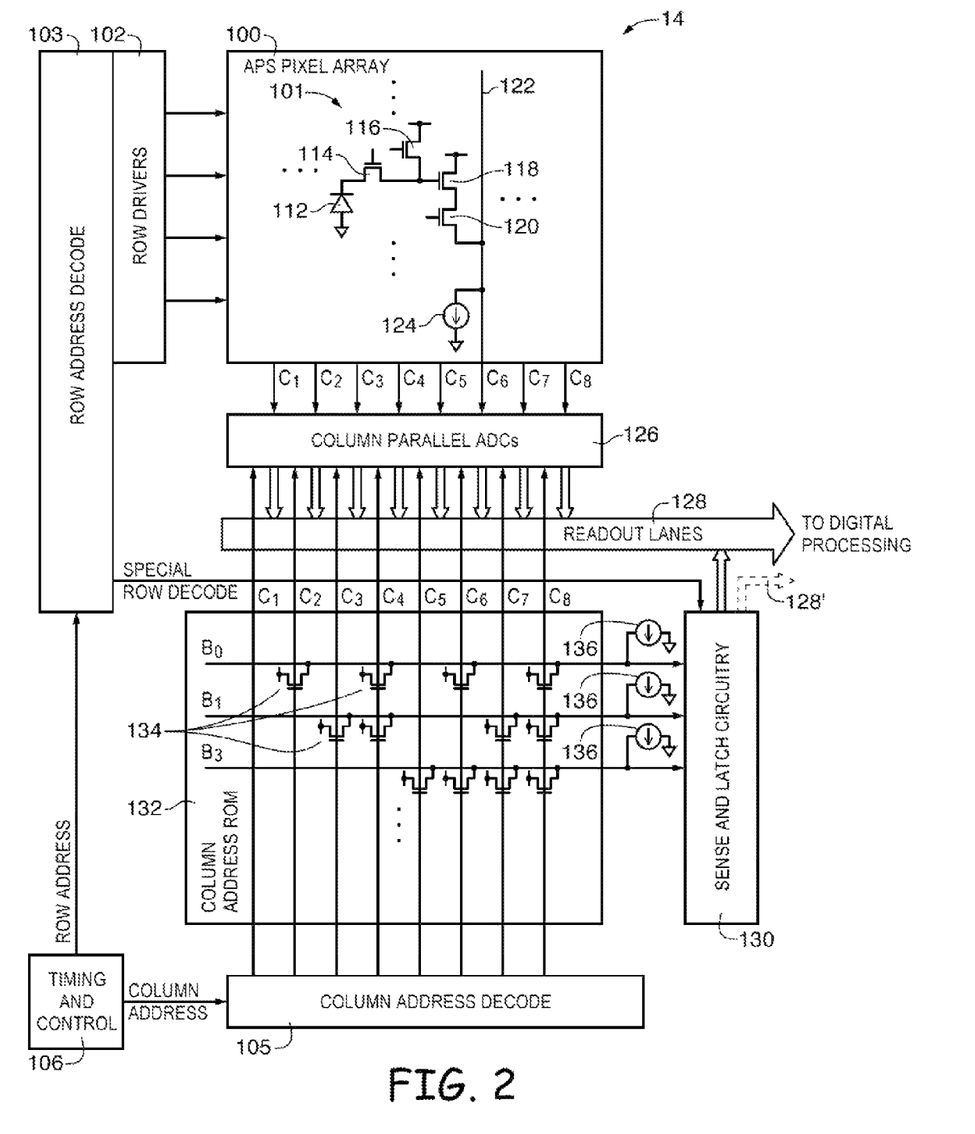
FIG. 2 is a block diagram of an imager that includes column error detection circuitry in accordance with an embodiment of the present invention.

It may be desirable to provide image sensors with pixels having error detection capabilities. Such image sensors may provide increased reliability, especially in error-sensitive applications such as automotive safety applications. FIG. 2 is a diagram of an illustrative imager 14. Imager 14 may include an array 100 of pixels 101 arranged in rows and columns. Each pixel may, for example, include photodiode 112, transfer gate 114, reset transistor 116, source-follower transistor 118, and row select transistor 120. Row lines may be selectively activated by row drivers 102 in response to row address decoder 103 and column lines may be selectively activated by column address decode 105. Thus, a row and column address is provided for each pixel.

Imager 14 may be operated by a timing and control circuit 106, which controls decoders 103 and 105 for selecting the appropriate row and column lines for pixel readout, and row and column driver circuitry such as row driver circuitry 102, which apply driving voltages (e.g., control signals) to the transistors of the selected row and column lines. In response, the pixels produce pixel signals, which typically include a pixel reset signal and a pixel image signal for each pixel (or each photosensitive region of each pixel) that are sampled and converted from analog to digital values using analog-to-digital converter (ADC) circuitry such as column parallel ADC circuits 126. The converted pixel signals may be provided to digital processing such as a digital image processor (e.g., image processing and data formatting circuitry 16 of FIG. 1) via readout lanes 128 (e.g., readout paths).

Column control signals such as generated by column address decode 105 in controlling column parallel ADC circuitry 126 and readout lanes 128 may be verified using error detecting circuitry such as column address read-only memory (ROM) 132 and sense and latch circuitry 130. Column address ROM 132 may store a unique value for each column of pixel array 100 (e.g., columns C1-C8 of column address ROM 132 may correspond to respective columns C1-C8 of pixel array 100). In the example of FIG. 2, each column may be encoded with a corresponding unique value using transistors 134 that couple respective rows in column address ROM 132 of that column to a positive power supply terminal. For example, no transistors 134 are provided for column C1, so when column C1 is selected (e.g., driven with a logic one voltage to select column C1 of pixel array 100), current sources 136 pull the rows of ROM 132 low to produce unique value "000" on bit lines B2, B1, and B0. Unique value "000" may be detected and stored by sense and latch circuitry 130 and read out using readout lanes 128 to verify that the column address of C1 was correctly asserted (e.g., by comparing to the intended address to be selected). As another example, when column C2 is selected by providing a logic one, transistor 134 is enabled of column C2 is enabled which pulls bit line B0 high, resulting in an output unique value of "001" on respective bit lines B2, B1, and B0. In the example of FIG. 2, the columns of pixel array 100 are encoded in a binary arrangement of unique values (e.g., ROM 132 stores a unique value of "000" for column C1, a unique value of "001" for column C2, a unique value of "010" for column C3, "011" for column C4, "100" for column C5, "101" for column C6, "110" for column C7, and "111" for column C8. If desired, unique values for additional columns of pixel array 14 may be provided with additional columns and rows of column address ROM 132.

If desired, column address ROM 132 may be provided with optional dedicated readout lanes 128' that provide unique values read from column address ROM 132 to digital processing circuitry (e.g., connection 129 between circuitry 130 and readout lanes 128 may be replaced with a connection to dedicated readout lanes 128'). In this scenario, the unique outputs of column address ROM 132 may be read out simultaneously with image signals from each row of pixel array 100 (e.g., it is not necessary to use reserved row addresses for accessing column address ROM 132).

Figure 3:
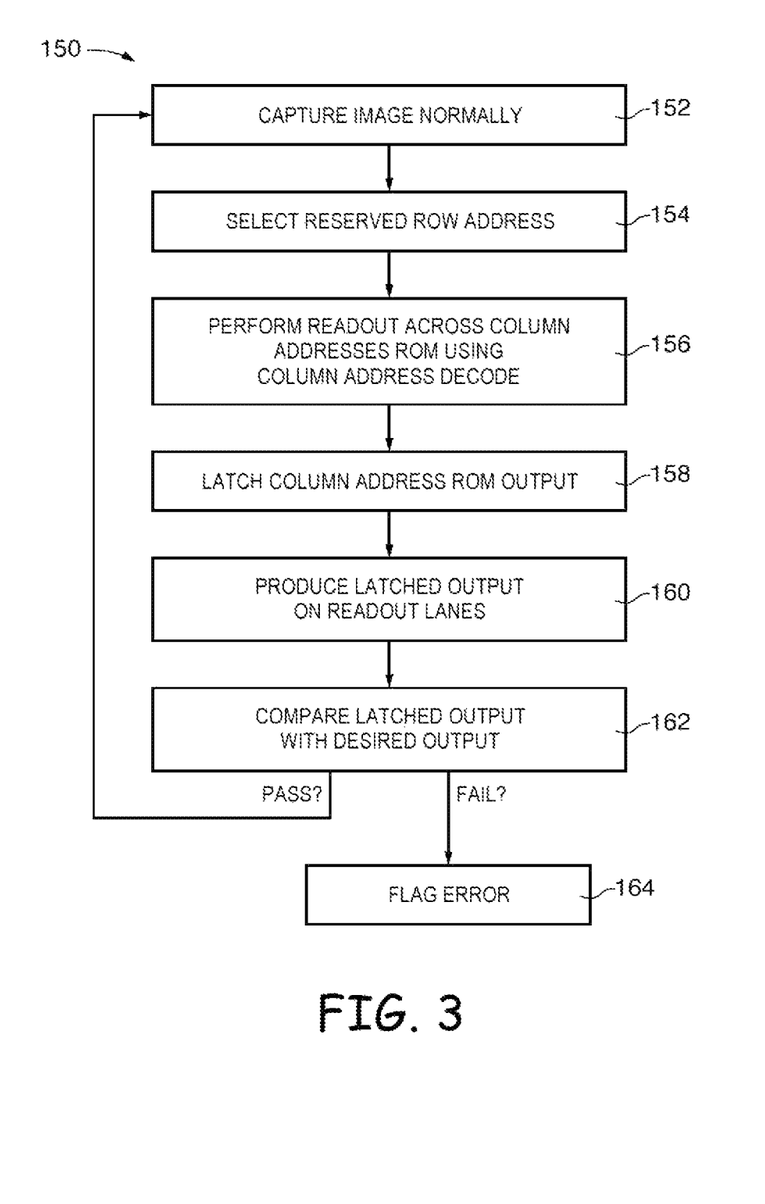
FIG. 3 is a flow chart of illustrative steps that may be performed in operating an imager for real-time detection of column control signal errors in accordance with an embodiment of the present invention.

Readout of each row of pixel array 100 or of column address ROM 132 may be performed in a column by column order using column parallel ADC circuitry 126 (e.g., each column may have its own respective ADC circuit that converts signals on that column to digital values). FIG. 3 is a flow chart of illustrative steps that may be performed to verify column addressing operations using column address ROM 132 of FIG. 2.

During step 152, the imager may capture an image normally. For example, timing and control circuitry 106 may provide row address and column address signals that are used by decode circuitry 103 and 105 to provide row and column control signals to pixel array 100. Each row of the pixel array may be read in order and columns of each row may be sequentially provided on readout lanes 128 (e.g., by providing a series of column addresses).

During step 154, the imager may select a reserved row address that has been assigned to column address ROM 132. The reserved row address is not used to address any rows of pixel array 100. In response to receiving the reserved row address, row address decoder 103 generates a special row decode control signal that is provided to and controls sense and latch circuitry 130 to enable latching of bit lines from column address ROM 132 (e.g., bit lines B0, B1, B2, etc.).

During step 156, the timing and control circuitry may perform readout operations across the columns of column address ROM 132. For example, timing and control circuitry 106 may sequentially provide all of the column addresses to column address decode, which asserts control signals on columns C1-C8 in order (e.g., in sequence). Sense and latch circuitry 130 may sense the voltages on bit lines B0, B1, B2 (e.g., using a sense amplifier coupled to each bit line) and store the sensed voltages for each column. Consider the scenario in which column addresses corresponding to columns C1-C8 are provided to column address decode 105 in ascending order. Sense and latch circuitry 130 may store the unique value from column address ROM for each column during step 158. In this example, the sequence of stored unique values should be "000," "001," "010," "011," "100," "101," "110," and "111" to correspond with the unique values as defined using transistors 134. The example of FIG. 3 in which readout operations across the column address ROM are performed during step 156 and outputs latched during step 158 is merely illustrative. In general, the outputs of the column address ROM may be latched while readout operations are performed.

During step 160, the latched outputs may be produced by sense and latch circuitry 130 on readout lanes 128. Subsequently, digital processing circuitry may be used to compare the latched output to the desired (e.g., expected) output during step 162 to determine whether any column addressing errors occurred. For example, the desired sequence of unique values that corresponds with the sequence of column addresses selected during step 156 may be compared to the latched sequence of unique values. If the desired and actual unique values do not match, an error may be flagged or otherwise identified during step 164. If the desired and actual unique values match (i.e., are the same) additional images may be captured by returning to step 152. Use of column address ROM 132 during image capture operations allows for real-time detection of errors during image capture operations performed by the pixel array.

Figure 4:
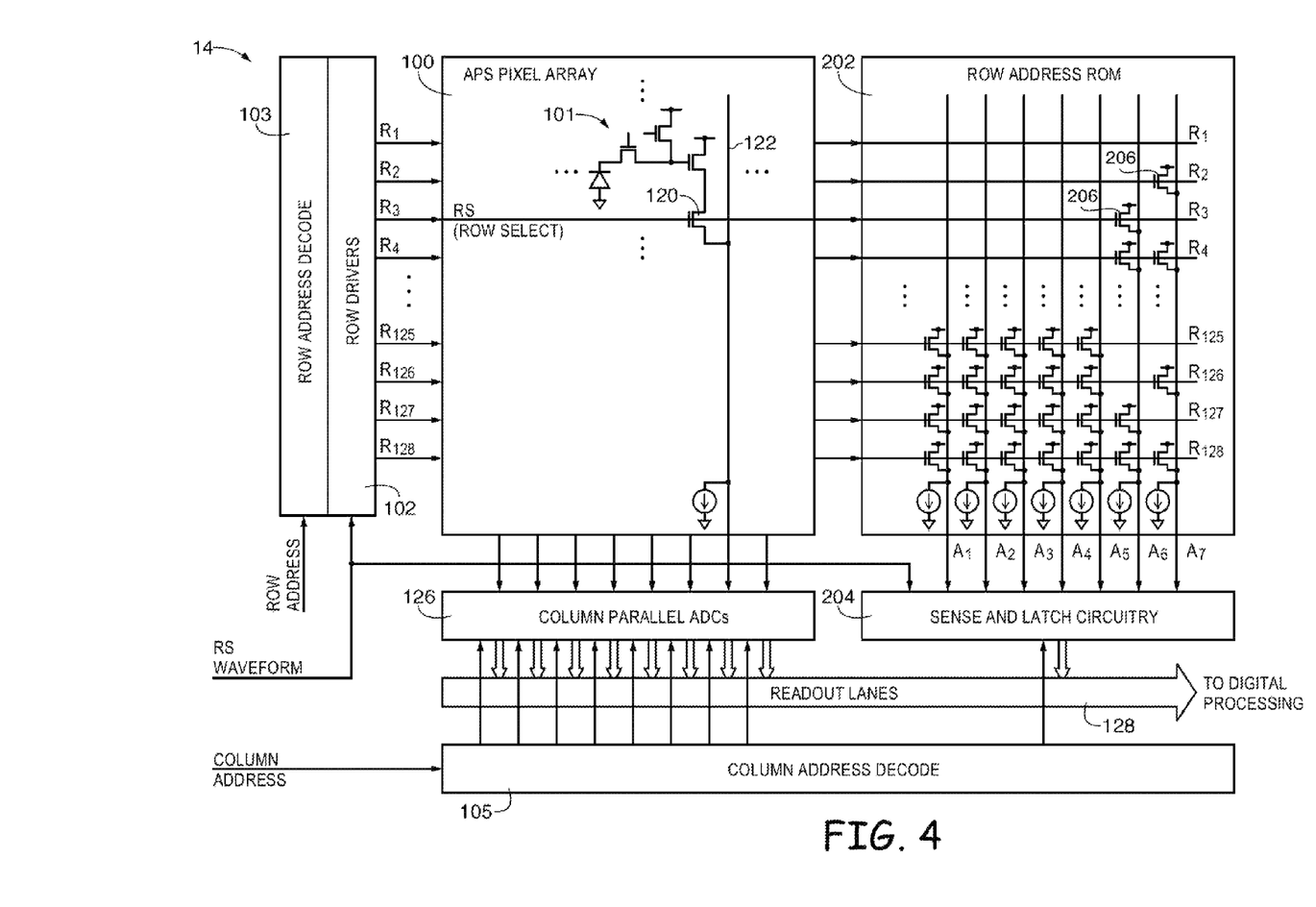
FIG. 4 is a block diagram of an imager that includes a row error detection read-only memory in accordance with an embodiment of the present invention.

In the example of FIG. 4, imager 14 is provided with an array of read-only memory elements having fixed output values. If desired, an imager may be provided with row error detection circuitry (e.g., in addition to or instead of column error detection circuitry 132 and 130 of FIG. 2). FIG. 4 is an illustrative diagram of an imager 14 including row error detection circuitry for real-time detection of errors in row operations. The row error detection circuitry may include row address ROM 202 and sense and latch circuitry 204.

Pixel array 101 may include rows of pixels 101 (e.g., rows R1-R8). Row readout operations on pixel array 101 involve the assertion of row select (RS) signals. Each row select signal, when asserted, enables row select transistors 120 of the selected row to transfer accumulated pixel charge to column paths 122. The row select transistors may be generated by row drivers 102 based on a row select waveform signal. Row address decode 103 may control row drivers 102 to generate row select signals based on a row address signal (e.g., provided by timing and control circuitry).

Row address ROM may be used to detect whether row select signals are correctly generated. Each row of row address ROM may correspond to a row of pixel array 101 and may store a unique value that identifies the corresponding row. In the example of FIG. 4, rows are mapped to unique values in a binary arrangement in which each column of row address ROM 202 represents a bit of a unique value. Transistors 206 may be placed to determine which bits of a unique value are logic one. For example, bit lines A1-A7 of row R1 maps to "0000000," whereas row R2 maps to "0000001" and row R128 maps to "1111111." In the example of FIG. 4, row address ROM 202 includes seven columns which supports up to $2^7$ (128) different unique values for respective rows. If desired, row address ROM 202 may be provided with fewer or additional columns based on the number of pixel array rows to be verified.

For each selected row of pixel array 101, sense and latch circuitry 204 may sense and store a unique value from row address ROM that identifies which row select signal was asserted (i.e., which row of pixel array 101 was selected). Sense and latch circuitry 204 may include a sense amplifier for each column and latch circuitry that stores outputs from the sense amplifiers. Alternatively, sense and latch circuitry 204 may be a copy of column parallel ADC circuitry 126 that converts analog voltages on bit lines of row address ROM 202 (e.g., A1-A7) to digital values. Illustrative circuitry 204 is shown in FIGS. 5A and 5B.

Figure 5A:
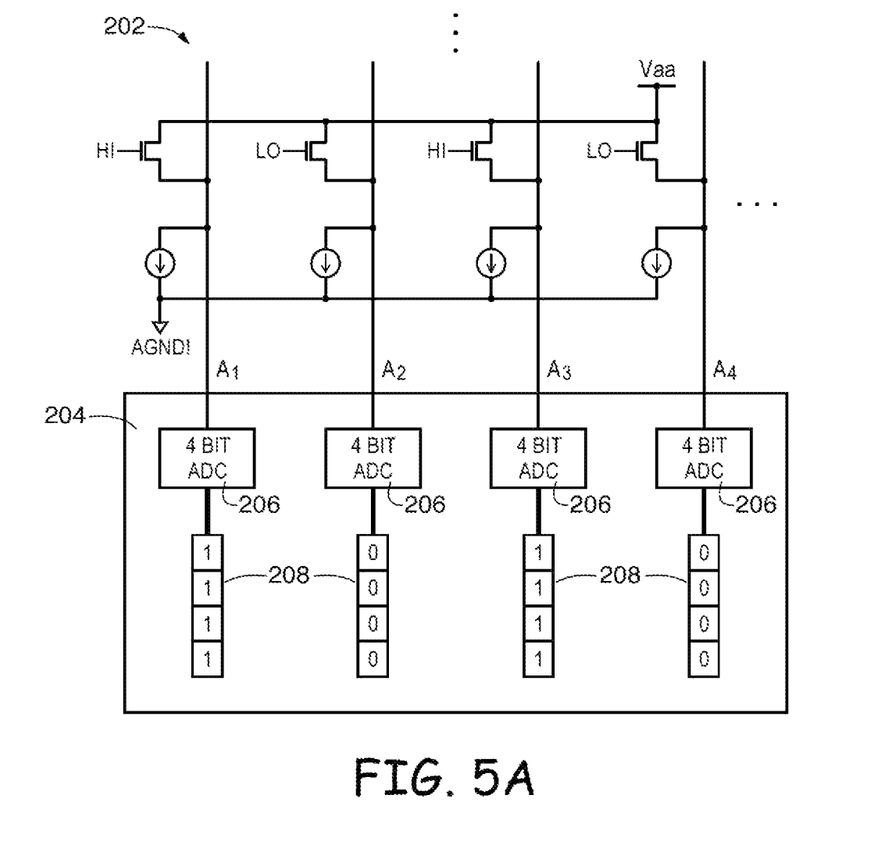
FIG. 5A is a diagram showing how column-parallel ADC circuitry may be used to read unique values from error detection circuitry in accordance with an embodiment of the present invention.
Figure 5B:
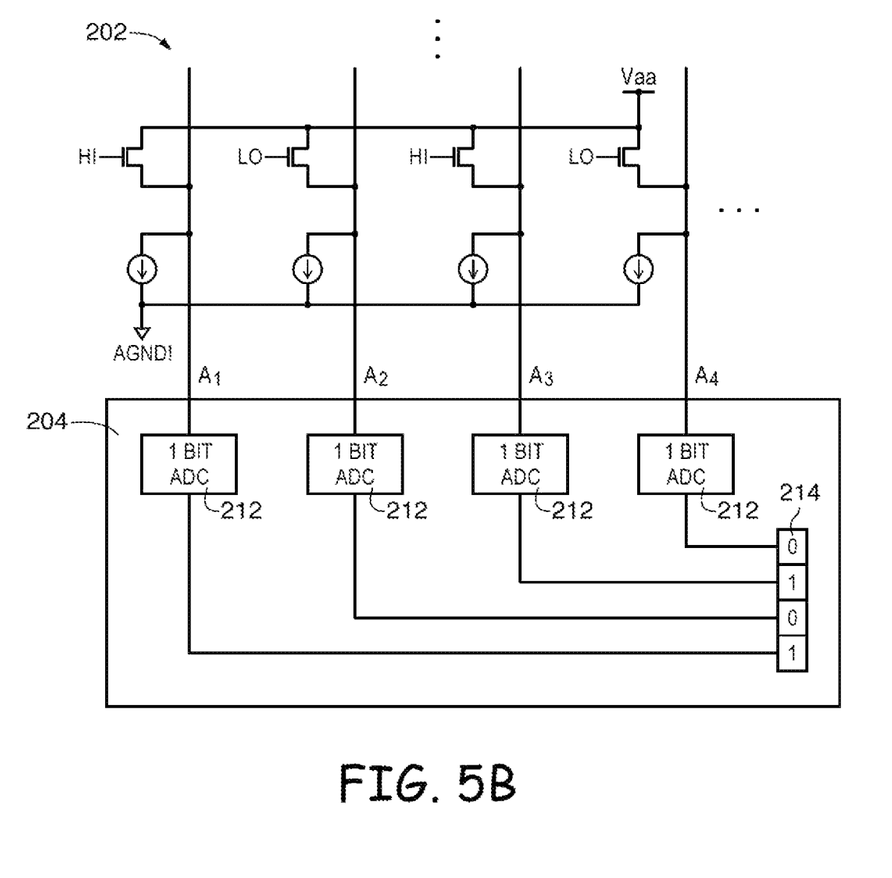
FIG. 5B is a diagram showing how 1-bit column-parallel ADC circuits may be used to read unique values from error detection circuitry in accordance with an embodiment of the present invention.

In the example of FIG. 5A, circuitry 204 includes ADC circuits 206 that are coupled to respective columns of address ROM 202. Each ADC circuit 206 may convert analog voltages on the respective column to a digital value having bits that are stored by circuitry 208 (e.g., registers, latches, etc.). In the example of FIG. 5A, ADC circuits 206 are 4-bit ADC circuits, but any desired ADC circuits may be used. For example, the ADC circuits may produce a digital output having a number of bits that is equal to the number of bits produced by ADC circuits 126 that are coupled to pixel array 101 of FIG. 4. In this scenario, the unique value produced by address ROM 202 may be visually represented in an image as N rows of black (dark) and white (bright) pixels interpretable as a binary coded row address where dark represents a logic zero and bright represents a logic one (or vice versa). In the example of FIG. 5B, circuitry 204 includes only 1-bit ADC circuits 212, thereby conserving circuit area. In this scenario, each row address is represented by the "gray" value of a single "N-bit" pixel. This may be presented visually as a single column of pixels whose value varies smoothly from black on one end to bright on the other end. If desired, the ADC circuitry as shown in FIGS. 5A and 5B may be used for column address ROMs as well (e.g., replacing sense and latch circuitry 130 of FIG. 2).

Figure 6A:
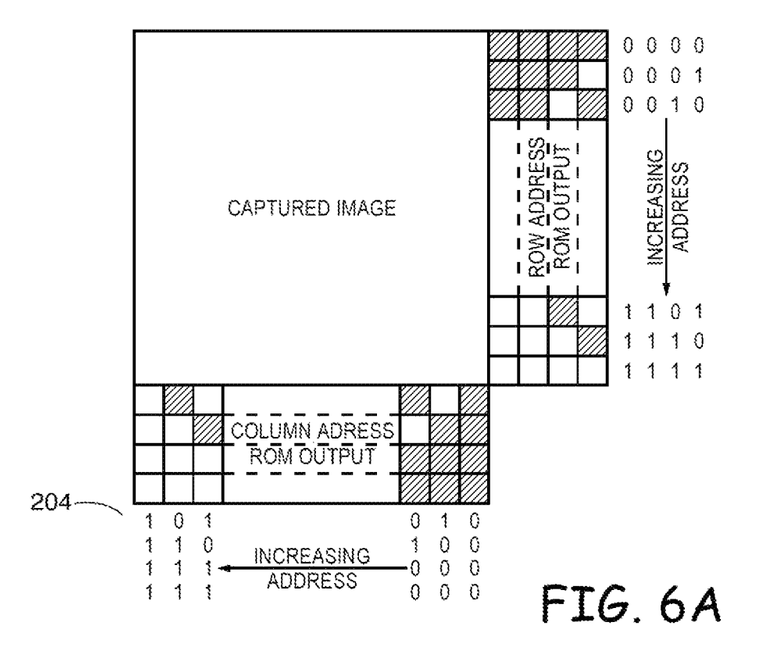
FIGS. 6A and 6B are diagrams of composite images that may be produced by an imager having row and column error detection circuitry in accordance with an embodiment of the present invention.

As shown in FIG. 6A, row address ROM output and column address ROM outputs may be combined into a single composite image having additional reserved rows associated with column address ROM outputs and additional columns associated with row address ROM outputs (e.g., in addition to the rows and columns of the captured image). The composite image may, for example, be displayed for visual identification of column and/or row control signal errors. In the example of FIG. 6A, the unique value retrieved from a ROM may be represented by a series of "bright" and "dark" pixels in the composite image. For example, the value of each additional pixel of the composite image may be produced by a corresponding 4-bit ADC circuit of FIG. 5A. This arrangement allows for visual verification of address bits. For example, the first row of the pixel array, if correctly addressed, may be verified by a series of dark pixels ("0000") representing respective address bits produced by the first row of the row address ROM output. Similarly, correct column addresses may be verified by observing the portion of the composite image generated from the column address ROM output.

Figure 6B:
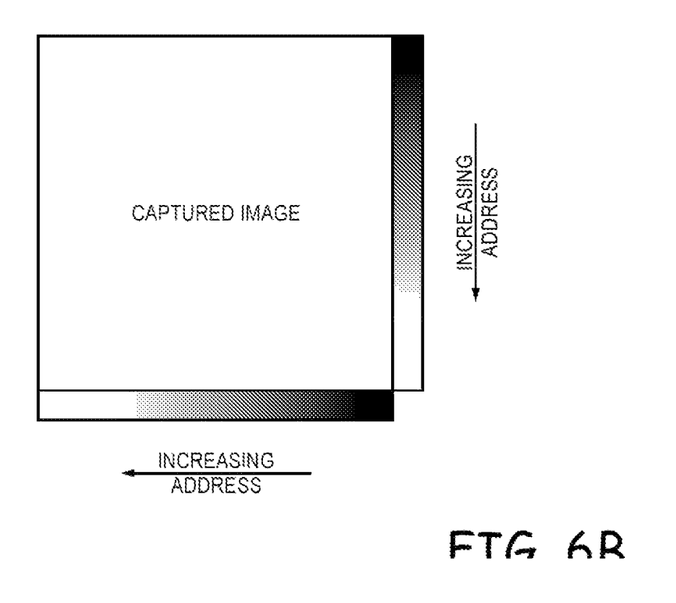

In the example of FIG. 6B, only a single additional column and row of pixels is added to a captured image to form a composite image. Each additional pixel of the composite image may, for example, be produced by the combination of 1-bit ADC values generated by circuitry 204 of FIG. 5B. In this scenario, the row and column addresses may be visually verified as the value/intensity of each pixel. During correct operation, the intensity across the additional row increases (or decreases) consistently as the column address increases. Similarly, the intensity across the additional column consistently increases (or consistently decreases) as the row address increases.

Figure 7:
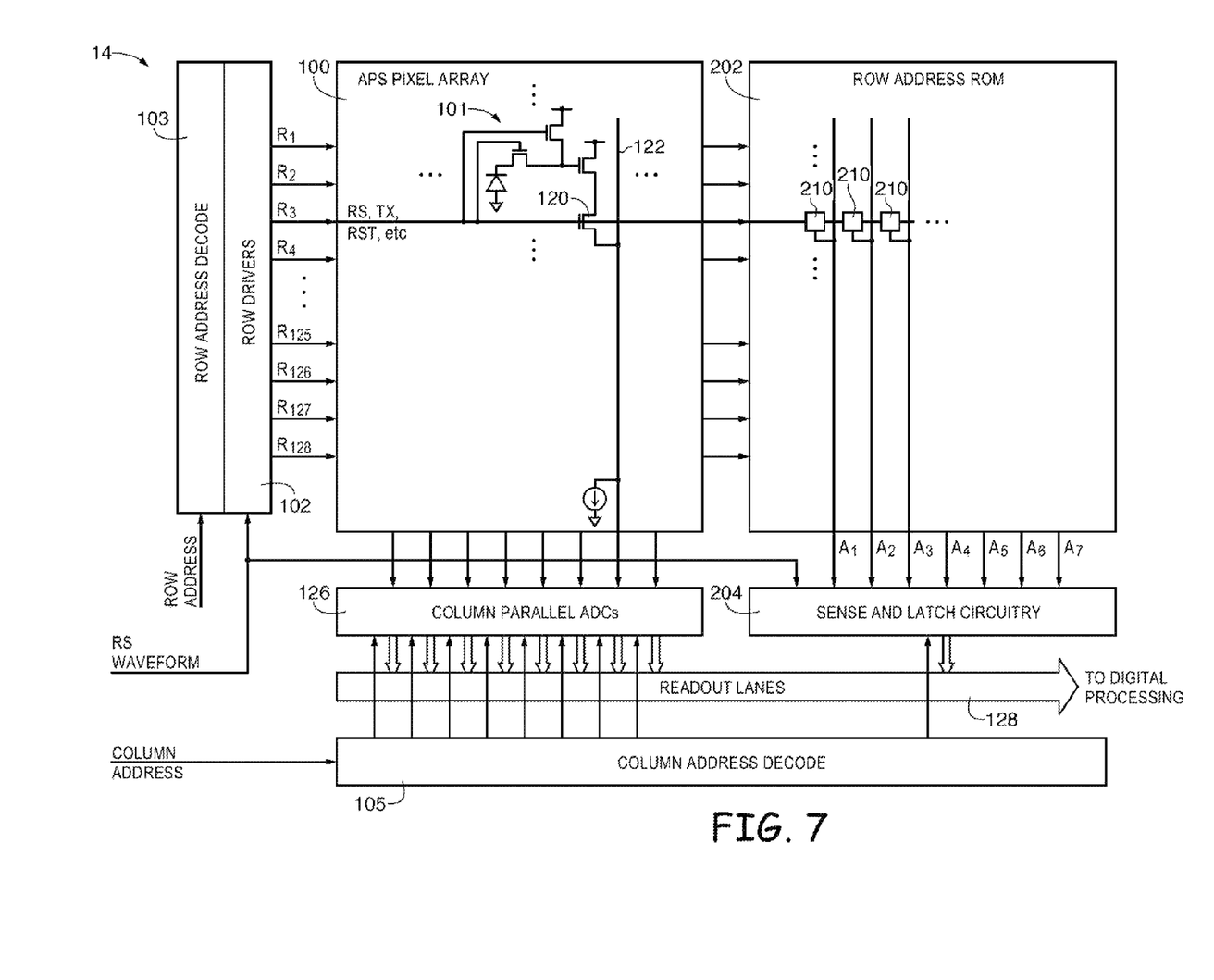
FIG. 7 is a block diagram of an imager that includes an array of row error detection circuits in accordance with an embodiment of the present invention.

If desired, row address ROM 202 may be provided with expanded error detecting capabilities as shown in FIG. 7. As shown in FIG. 7, row address ROM may include an array of error detection circuits 210 that corresponds with pixel array 101 (e.g., each pixel 101 of pixel array 101 may have a corresponding circuit 210 at a matching row and column of row address ROM 202). Each circuit 210 may receive one or more control signals from row drivers 102. The control signals may be the control signals provided to the corresponding pixel or pixel row of pixel array 101. Error detection circuits 210 may, for example, be modified copies of corresponding pixels in pixel array 101. By operating the modified pixel copies using the same control signals as provided to pixel array 101, the error detection circuitry may be able to detect errors caused by any of the pixel control signals (e.g., each error detection circuit 210 can detect errors from any one of multiple pixel control signals).

Figure 8:
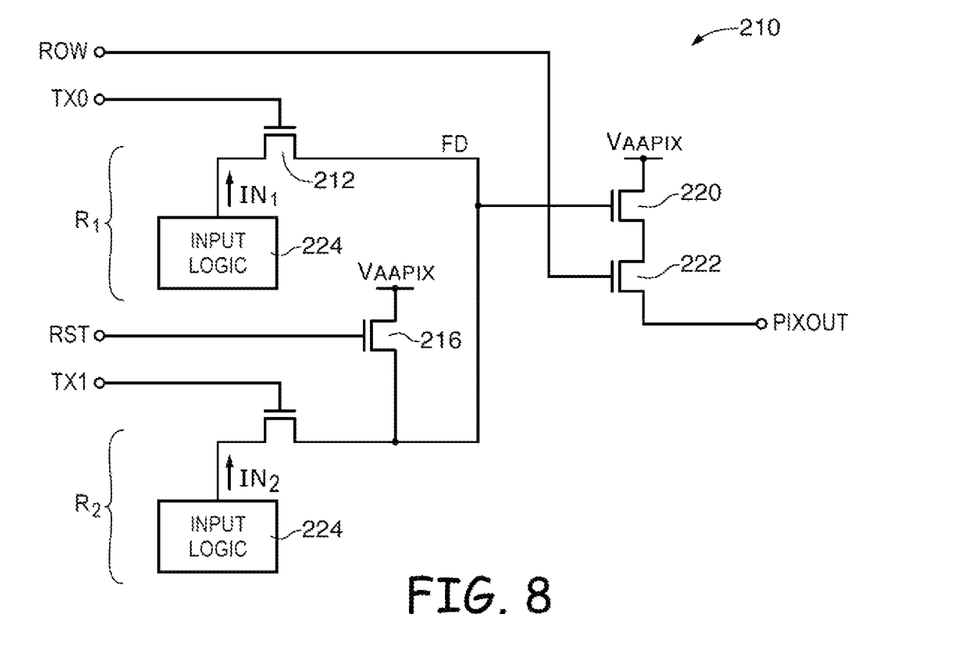
FIG. 8 is a circuit diagram of an error detection circuit in accordance with an embodiment of the present invention.

In some scenarios, pixels of adjacent rows may use shared circuitry. In these scenarios, circuits 210 may include portions that are shared between adjacent rows of row address ROM 202. FIG. 8 is an illustrative diagram of an error detection circuit 210 that may be used in row address ROM 202 of FIG. 7. In the example of FIG. 8, error detection circuitry 210 may be coupled to and receive pixel control signals for adjacent rows of a pixel array (e.g., rows R1 and R2 of pixel array 101 of FIG. 7). Error detection circuitry 210 may be a modified copy of the corresponding pixel circuitry in the pixel array. For example, transfer gates 212, reset transistor 216, source-follower transistor 220, and row select transistor 222 may be copies of and connected similarly to a two-way shared pixel arrangement in pixel array 101. Instead of a photodiode or photosensitive region, error detection circuitry 210 includes input logic 224 that provides input signals that may be read out by operating error detection circuitry 210 similarly to the corresponding pixel circuitry of the pixel array. For example, reset transistor RST 216 may be controlled via reset signal RST to reset floating diffusion region FD. Transfer gate 212 may be controlled using transfer gate signals (e.g., TX0 or TX1) to transfer input signals (e.g., IN1 and/or IN2) to floating diffusion region FD. Row select transistor 222 may be controlled by row select signal ROW to convey the input signal(s) from the floating diffusion region to a pixel output as the PIXOUT signal (e.g., to a column path). In this way, successful operation of error detection circuit 210 using pixel control signals causes circuit 210 to produce signals from input logic 224 that can be compared to expected values to identify errors. If pixel control signals are incorrect, circuit 210 may operate incorrectly and produce incorrect values that do not match the expected values.

Figure 9:
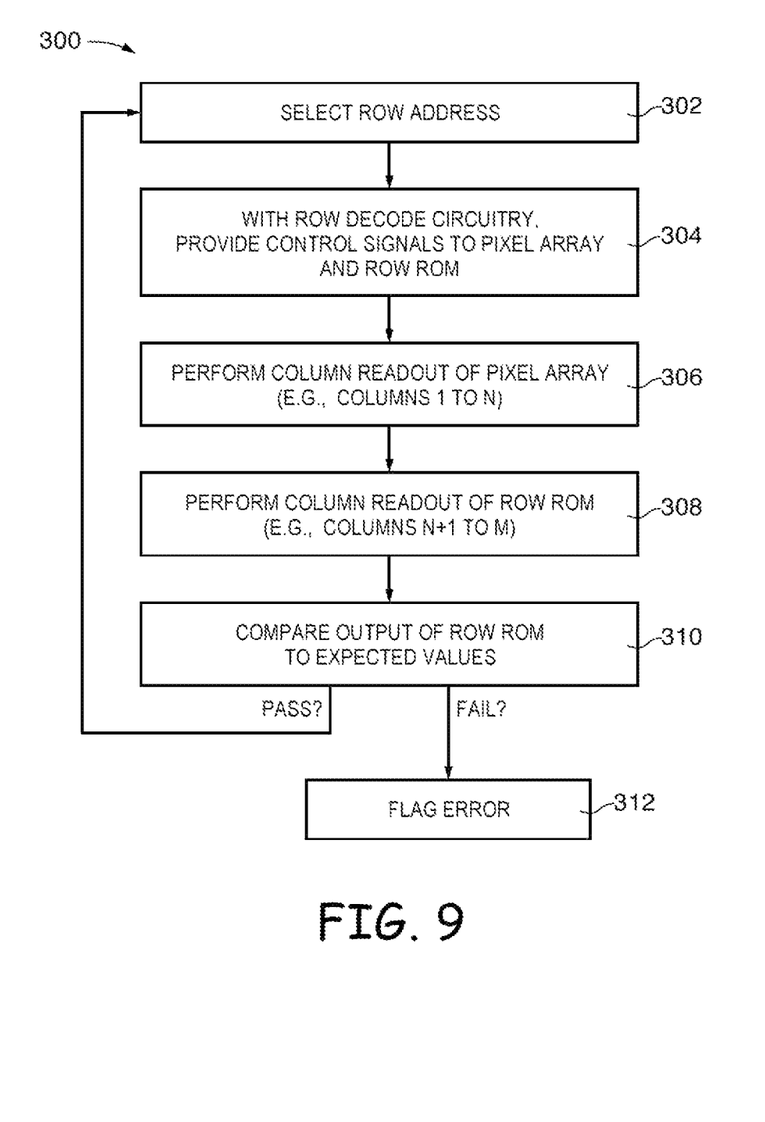
FIG. 9 is a flow chart of illustrative steps that may be performed in operating an imager for real-time detection of row control signal errors in accordance with an embodiment of the present invention.

FIG. 9 is a flow chart of illustrative steps that may be performed by timing and control circuitry to operate an imager with row error detection capabilities such as imager 14 of FIG. 7. During step 302, the control circuitry may select a row address of pixel array 101. During subsequent step 304, the control circuitry may provide the selected row address to row decode circuitry 103, which provides appropriate row control signals to pixel array 101 and row address ROM 202 based on the selected row address. Pixel array 101 is controlled by the row control signals to produce pixel signals on column paths 122 (e.g., from accumulated charge at photodiodes of the pixels), whereas row address ROM 202 is controlled by the same pixel signals to produce output signals from input logic 224. During step 306, the control circuitry may perform column readout of the selected row of the pixel array (e.g., columns 1 to N), thereby providing captured image signals to digital processing via ADC circuitry and readout lanes. During step 308, the control circuitry may perform column readout of the selected row of the row address ROM (e.g., columns N+1 to M corresponding to columns A1, A2, etc. of FIG. 7). The output of the row address ROM may be a unique identifier that identifies whether the correct row of pixel array 101 and row address ROM 202 has been selected by row drivers 102. For example, input logic 224 of FIG. 4 may be a connection to a logic one voltage terminal or a logic zero voltage terminal in a binary mapping arrangement similar to FIG. 4 (e.g., the input logic of row R1 may be all tied to logic zero, the input logic of row R1 may include one bit tied to logic zero and the remaining bits tied to logic one, etc.). During step 310, digital processing circuitry may receive and compare the output of the row ROM to expected values. If the output of the row ROM fails to match the expected values, an error may be flagged during step 312. If the output of the row ROM matches the expected values, additional rows may be operated to capture an image while detecting errors in real time by returning to step 302.

Figure 10:
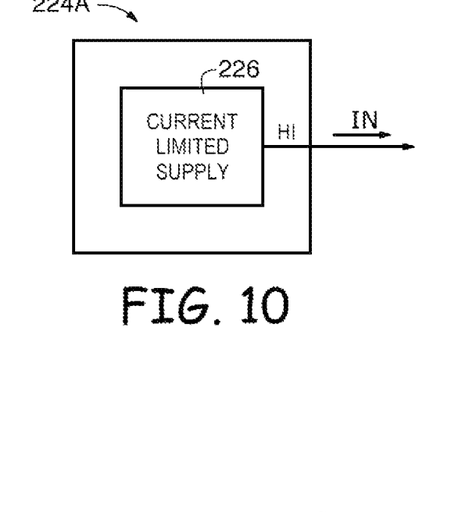
FIG. 10 is a diagram of an illustrative input circuit for producing a logic one value for an error detection circuit in accordance with an embodiment of the present invention.
Figure 11:
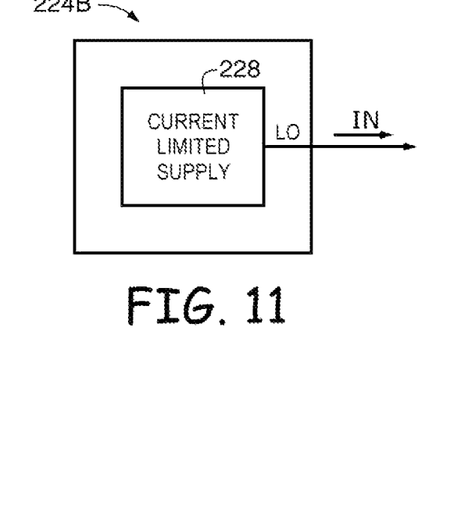
FIG. 11 is a diagram of an illustrative input circuit for producing a logic zero value for an error detection circuit in accordance with an embodiment of the present invention.

FIG. 10 is an illustrative diagram of input logic 224A in which a logic one signal is produced using a current-limited supply circuit 226. Input logic 224A may, for example, be provided at row and column positions of ROM 202 of FIG. 7 corresponding to transistors 206 of FIG. 4. Conversely, FIG. 11 is an illustrative diagram of input logic 224B in which a logic zero is produced using a current-limited supply circuit 228. Input logic 224B may, for example, be provided at row and column positions of ROM 202 of FIG. 7 corresponding to positions of ROM 202 of FIG. 4 that do not have any transistors 206. Use of current-limited supplies may help prevent scenarios in which a fault could potentially short the input logic to a voltage supply. For example, a fault could cause signal RST and signal TX of FIG. 8 to be both asserted simultaneously. In this scenario, input logic 224 may be shorted to the pixel supply voltage (e.g., that provides VAAPIX) and the current-limited supply may help ensure that only a limited amount of current is drawn.

Figure 12:
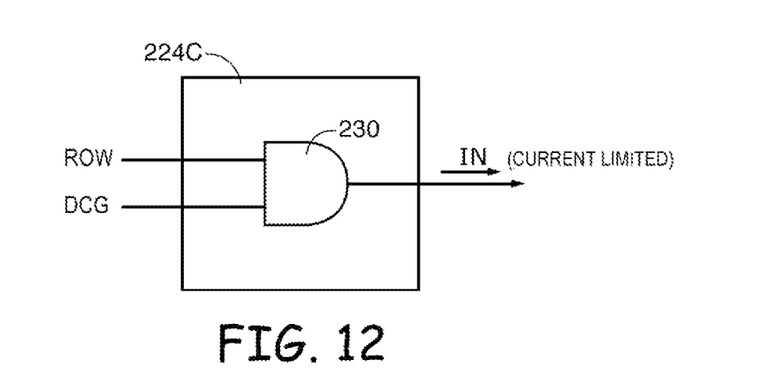
FIG. 12 is a diagram of an illustrative input circuit that produces an input signal for an error detection circuit based on row select and dual conversion gain signals in accordance with an embodiment of the present invention.
Figure 13:
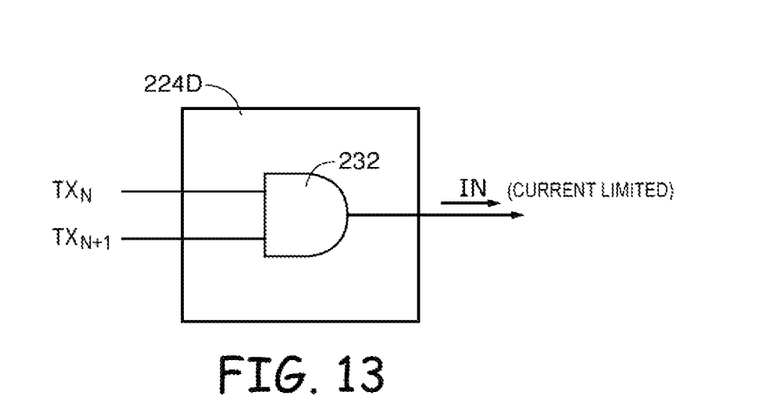
FIG. 13 is a diagram of an illustrative input circuit that produces an input signal for an error detection circuit based on transfer gate signals for adjacent pixel rows in accordance with an embodiment of the present invention.

The examples of FIG. 10 and FIG. 11 in which input logic 224 produces only static output signals are merely illustrative. If desired, input logic 224 may produce output signals based on input control signals such as row control signals received from row drivers. FIG. 12 is an illustrative diagram of input logic 224C in which AND gate 230 receives row select signal ROW and dual conversion gain control signal DCG and produces signal IN. Signal IN may be used to identify whether appropriate control signals have been provided by row drivers 102 to enable dual conversion gain mode (e.g., signal IN may have an expected value of logic one for high gain mode and an expected value of logic zero for low gain mode). FIG. 13 is an illustrative diagram of input logic 224D in which AND gate 232 receives transfer gate control signals $TX_N$ and $TX_{N+1}$ for adjacent pixel rows. In the example of FIG. 13, signal IN may be used to identify whether appropriate control signals have been provided to enable shared readout (e.g., transfer gate controls signals $TX_N$ and $TX_{N+1}$ should both be asserted for shared readout, whereas only one transfer gate control signal should be asserted for normal single-pixel readout). Input logic such as AND gates 230 and 232 may have current-limited outputs to help protect against faults.

Figure 14:
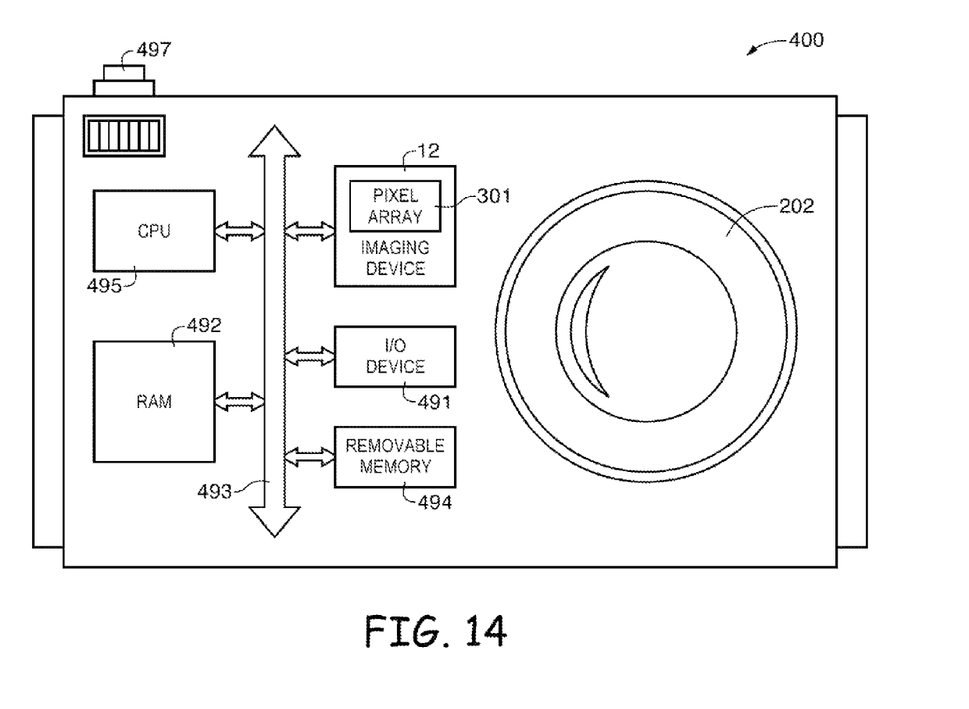
FIG. 14 is a block diagram of a processor system employing an imager with error detection capabilities in accordance with an embodiment of the present invention.

FIG. 14 is a simplified diagram of an illustrative processor system 400, such as a digital camera, which includes an imaging device 12 (e.g., the camera module of FIG. 1) employing an imager with real time error detection circuitry as described above. The processor system 400 is exemplary of a system having digital circuits that could include imaging device 12. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 400, for example a digital still or video camera system, generally includes a lens 202 for focusing an image on pixel array 301 when a shutter release button 497 is pressed, central processing unit (CPU) 495, such as a microprocessor which controls camera and one or more image flow functions, which communicates with one or more input/output (I/O) devices 491 over a bus 493. Imaging device 12 also communicates with CPU 495 over bus 493. System 400 also includes random access memory (RAM) 492 and can optionally include removable memory 494, such as flash memory, which also communicates with CPU 495 over the bus 493. Imaging device 12 may be combined with the CPU, with or without memory storage on a single integrated circuit or on a different chip. Although bus 493 is illustrated as a single bus, it may be one or more busses, bridges or other communication paths used to interconnect system components of system 400.

Examples describing error detection circuitry provided for a photosensitive image sensor are described. However, it should be understood that the error detection capabilities may be provided for verifying control (e.g., address) signals for any desired image sensor having an array of pixels or cells. For example, error detection circuitry such as row or column address ROMs may be provided for capacitive image sensors (e.g., touch sensors), lensless light field cameras, or any desired image sensor.

Various embodiments have been described illustrating imagers with real time error verification/detection circuitry. An imager may include an array of pixels and an array of error detection circuits. The array of pixels may receive at least one control signal that controls the array of pixels to produce image pixel signals. The error detection circuits may receive the at least one control signal and produce error detection signals. The image pixels and error detection signals may be conveyed over a readout path to image processing circuitry such as an external digital signal processor. The imager may include timing and control circuitry that generates row address signals to select a row of the array of pixels, a row address decoder that receives the row address signals, and row driver circuitry that is controlled by the row address decoder to provide the at least one control signal to the array of pixels and the array of error detection circuits. Control signals that may be provided simultaneously to a pixel array and an error detection array include row select control signals, column select control signals, transfer gate control signals, dual conversion gain control signals, reset signals, and/or other pixel control signals.

Each error detection circuit may be a modified copy of a corresponding pixel in the pixel array. The pixel may be modified to include an input circuit that produces an input signal at an output. The input circuit may be a current-limited supply that produces a static output voltage or may be a current-limited logic gate such as an AND gate that receives one or more of the control signals. Each error detection circuit may include pixel circuitry such as a transfer gate, source follower, reset transistor, anti-bloom transistor, dual conversion gain transistor, and row select transistor that are controlled by the control signals.

The foregoing is merely illustrative of the principles of this invention and various modifications can be made by those skilled in the art without departing from the scope and spirit of the invention.

What is claimed is:

1. An imager, comprising:
   an array of pixels that receives at least one control signal that controls the array of pixels to produce image pixel signals;
   an array of error detection circuits that receives the at least one control signal, wherein the array of error detection circuits produces error detection signals based on the at least one control signal wherein the array of error-detection circuits is arranged in rows and columns, and wherein the array of pixels is arranged in matching rows and columns; and a readout path over which the image pixels and the error detection signals are conveyed together to form a composite image.

2. The imager defined in claim 1 wherein each error detection circuit comprises a modified copy of a corresponding pixel in the array of pixels.

3. The imager defined in claim 2 further comprising:
timing and control circuitry that generates row address signals to select a row of the array of pixels;
a row address decoder that receives the row address signals; and
row driver circuitry that is controlled by the row address decoder to provide the at least one control signal to the array of pixels and the array of error detection circuits.

4. The imager defined in claim 3 wherein the at least one control signal comprises a plurality of row select control signals and wherein each row of the array of error detection circuits receives a respective one of the plurality of row select control signals and stores a unique value that is produced in response to assertion of the respective row select control signal.

5. The imager defined in claim 3 wherein each error detection circuit of the array of error detection circuits comprises:
an input circuit that produces an input signal at an output;
a transfer gate coupled between the output and a floating diffusion node, wherein the transfer gate receives a transfer gate control signal from the row driver circuitry.

6. The imager defined in claim 5 wherein each error detection circuit of the array of error detection circuits further comprises:
a reset transistor coupled between the floating diffusion node and a pixel supply voltage terminal, wherein the reset transistor receives a reset control signal from the row driver circuitry.

7. The imager defined in claim 6 wherein each error detection circuit of the array of error detection circuits further comprises:
a source-follower transistor coupled between the floating diffusion node and a column path.

8. The imager defined in claim 7 wherein each error detection circuit of the array of error detection circuits further comprises:
a row select transistor coupled between the source-follower transistor and the column path, wherein the row select transistor receives the respective row select control signal for that error detection circuit.

9. The imager defined in claim 5 wherein the input circuit comprises an AND gate that receives at least two of the control signals.

10. The imager defined in claim 3 wherein the timing and control circuitry generates column address signals to select a column of the array of pixels, the imager further comprising:
a column address decoder that receives the column address signals and generates column control signals; and
analog-to-digital converter circuitry that receives the image pixel signals and column control signals and produce converted pixel image signals on the readout path.

11. The imager defined in claim 10 further comprising:
sense and latch circuitry that receives and stores the error detection signals, wherein the sense and latch circuitry produces the error detection signals on the readout path.

12. The imager defined in claim 10 wherein the analog-to-digital converter circuitry comprises a first set of analog-to-digital converter circuits that are coupled to respective columns of the array of image pixels and wherein the sense and latch circuitry comprises a second set of analog-to-digital converter circuits that are coupled to respective columns of the array of error-detection circuits.

13. The imager defined in claim 10 wherein the array of error-detection circuits comprises a first array of error-detection circuits, the imager further comprising:
a second array of error-detection circuits that receives the column control signals and produces additional error detection signals on the readout path.

14. The imager defined in claim 1 wherein the array of error detection circuits comprises a read-only memory.

15. A method of operating an imager for real time error detection, the method comprising:
with control circuitry, generating control signals for an array of pixels that direct the array of pixels to produce image signals;
with the control circuitry, providing the control signals to an array of error detection circuits; and
with the array of error detection circuits, producing an identifier based on the control signals, wherein the array of pixels is arranged in rows and columns, and wherein the array of error detection circuits is arranged in matching rows and columns.

16. The method defined in claim 15 wherein the control circuitry comprises:
timing and control circuitry that generates a row address; and
row address decoder circuitry that controls row driver circuitry to generate row control signals based on the row address, wherein the row control signals include a plurality of row select signals for each row of the array of pixels.

17. The method defined in claim 16 further comprising:
with digital processing circuitry, receiving the identifier; and
with the digital processing circuitry, comparing the identifier to an expected identifier value to determine whether an error occurred in generating the control signals for the array of pixels.

18. The method defined in claim 15 wherein each error detection circuit comprises a modified copy of a corresponding pixel in the array of pixels and wherein generating the control signals comprises generating a transfer gate control signal and a row select control signal for the array of pixels.

19. A system, comprising:
a central processing unit;
memory;
input-output circuitry; and
an imaging device, wherein the imaging device comprises:
a pixel array;
control circuitry that generates control signals for the pixel array; and
an array of error-detection circuits that receive the control signals from the control circuitry and produces identifier signals based on the control signals, each error detection circuit in the array of error detection circuits comprising:
an input circuit; and
a transfer gate coupled between the input circuit and a floating diffusion node.

20. The system defined in claim 19 further comprising:
a lens that focuses an image on the pixel array, wherein the array of error-detection circuits is arranged in rows and columns, wherein the pixel array is arranged in matching rows and columns, and wherein each error-detection circuit comprises a modified copy of a pixel in the matching row and column of the pixel array.

21. The system defined in claim 19 wherein the pixel array is coupled to a first readout lane circuitry and wherein the array of error-detection circuits is coupled to a second readout lane circuitry.

* * * * *